United States Patent
Tatsuzawa et al.

(10) Patent No.: US 10,350,658 B2
(45) Date of Patent: Jul. 16, 2019

(54) TITANIUM CASTING PRODUCT FOR HOT ROLLING AND METHOD FOR PRODUCING THE SAME

(71) Applicant: NIPPON STEEL & SUMITOMO METAL CORPORATION, Tokyo (JP)

(72) Inventors: Yoshitsugu Tatsuzawa, Tokyo (JP); Tomonori Kunieda, Tokyo (JP); Kenichi Mori, Tokyo (JP); Hideki Fujii, Tokyo (JP); Kazuhiro Takahashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 15/513,904

(22) PCT Filed: Sep. 30, 2014

(86) PCT No.: PCT/JP2014/076076
§ 371 (c)(1),
(2) Date: Mar. 23, 2017

(87) PCT Pub. No.: WO2016/051499
PCT Pub. Date: Apr. 7, 2016

(65) Prior Publication Data
US 2017/0282231 A1 Oct. 5, 2017

(51) Int. Cl.
*B21B 1/02* (2006.01)
*B21B 3/00* (2006.01)
(Continued)

(52) U.S. Cl.
CPC .................. *B21B 1/02* (2013.01); *B21B 1/22* (2013.01); *B21B 3/00* (2013.01); *B22D 15/00* (2013.01);
(Continued)

(58) Field of Classification Search
CPC ............ C22F 1/00; C22F 1/183; B22D 15/00; B22D 21/06; B22D 21/005; B22D 15/005;
(Continued)

(56) References Cited

U.S. PATENT DOCUMENTS

| 2004/0040690 A1* | 3/2004 | Ray | B22D 13/00 164/529 |
| 2016/0038983 A1* | 2/2016 | Fujii | C22F 1/183 72/252.5 |
| 2017/0349973 A1* | 12/2017 | Tatsuzawa | C22C 1/02 |

FOREIGN PATENT DOCUMENTS

| CN | 105102679 A | 11/2015 |
| EP | 2982777 A1 | 2/2016 |
(Continued)

OTHER PUBLICATIONS

Partial Translation, Ushio JP 62-056561, Mar. 1987.*
(Continued)

*Primary Examiner* — Michael E. La Villa
(74) *Attorney, Agent, or Firm* — Birch, Stewart, Kolasch & Birch, LLP

(57) ABSTRACT

Provided is a titanium cast product made of commercially pure titanium, the titanium cast product being produced by electron-beam remelting or plasma arc melting, comprising: a melted and resolidified layer in a range of 1 mm or more in depth at a surface serving as a surface to be rolled, the melted and resolidified layer being obtained by adding one or more kinds of βstabilizer elements to the surface and melting and resolidifying the surface. An average value of β stabilizer element(s) concentration in a range of within 1 mm in depth is higher than βstabilizer element(s) concentration in a base material by, in mass %, equal to or more than 0.08 mass % and equal to or less than 1.50 mass %. As the material containing the β stabilizer element, powder, a chip, wire, or foil is used. As means for melting a surface
(Continued)

layer, electron-beam heating and plasma arc heating are used.

6 Claims, 1 Drawing Sheet

(51) Int. Cl.

| | |
|---|---|
| C22C 1/02 | (2006.01) |
| C22C 14/00 | (2006.01) |
| B32B 15/01 | (2006.01) |
| B22D 15/00 | (2006.01) |
| B22D 25/00 | (2006.01) |
| B22D 19/16 | (2006.01) |
| B22D 19/08 | (2006.01) |
| B22D 23/10 | (2006.01) |
| B22D 21/00 | (2006.01) |
| B22D 23/06 | (2006.01) |
| B22D 21/06 | (2006.01) |
| B32B 15/04 | (2006.01) |
| C22C 1/10 | (2006.01) |
| B32B 1/08 | (2006.01) |
| B21B 1/22 | (2006.01) |
| C22C 1/04 | (2006.01) |
| B32B 5/14 | (2006.01) |
| C23C 6/00 | (2006.01) |
| C23C 30/00 | (2006.01) |
| C23C 20/00 | (2006.01) |
| C23C 10/60 | (2006.01) |
| C23C 10/30 | (2006.01) |
| C23C 10/28 | (2006.01) |
| C23C 20/06 | (2006.01) |
| C23C 20/04 | (2006.01) |
| C23C 20/02 | (2006.01) |
| C22B 9/22 | (2006.01) |
| C22B 9/16 | (2006.01) |
| C22B 9/20 | (2006.01) |
| C23C 24/10 | (2006.01) |
| C22F 1/18 | (2006.01) |

(52) U.S. Cl.
CPC ............ *B22D 19/08* (2013.01); *B22D 19/16* (2013.01); *B22D 21/005* (2013.01); *B22D 21/06* (2013.01); *B22D 23/06* (2013.01); *B22D 23/10* (2013.01); *B22D 25/00* (2013.01); *B32B 1/08* (2013.01); *B32B 5/14* (2013.01); *B32B 15/01* (2013.01); *B32B 15/04* (2013.01); *B32B 15/043* (2013.01); *C22B 9/16* (2013.01); *C22B 9/20* (2013.01); *C22B 9/223* (2013.01); *C22B 9/225* (2013.01); *C22B 9/226* (2013.01); *C22B 9/228* (2013.01); *C22C 1/02* (2013.01); *C22C 1/0458* (2013.01); *C22C 1/1036* (2013.01); *C22C 14/00* (2013.01); *C22F 1/183* (2013.01); *C23C 6/00* (2013.01); *C23C 10/28* (2013.01); *C23C 10/30* (2013.01); *C23C 10/60* (2013.01); *C23C 20/00* (2013.01); *C23C 20/02* (2013.01); *C23C 20/04* (2013.01); *C23C 20/06* (2013.01); *C23C 24/106* (2013.01); *C23C 30/00* (2013.01); *C23C 30/005* (2013.01); *B21B 2001/022* (2013.01); *B21B 2001/028* (2013.01); *B21B 2001/225* (2013.01); *B32B 2311/18* (2013.01); *Y10T 428/12458* (2015.01); *Y10T 428/12806* (2015.01); *Y10T 428/12812* (2015.01); *Y10T 428/2495* (2015.01); *Y10T 428/24967* (2015.01); *Y10T 428/26* (2015.01)

(58) Field of Classification Search
CPC ........ B22D 25/00; B22D 19/08; B22D 19/16; B22D 23/06; B22D 23/10; B21B 1/02; B21B 3/00; B21B 2001/225; B21B 2001/022; B21B 2001/028; B21B 1/22; B32B 15/01; B32B 2311/18; B32B 1/08; B32B 5/14; B32B 15/04; B32B 15/043; C22C 1/02; C22C 14/00; C22C 1/0458; C22C 1/1036; C23C 6/00; C23C 10/28; C23C 10/30; C23C 20/00; C23C 10/60; C23C 30/00; C23C 20/02; C23C 20/04; C23C 20/06; C23C 26/02; C23C 30/005; C23C 24/106; B23K 26/0081; B23K 26/354; Y10T 428/12458; Y10T 428/12806; Y10T 428/12812; Y10T 428/24967; Y10T 428/2495; Y10T 428/26; C22B 9/16; C22B 9/20; C22B 9/22; C22B 9/223; C22B 9/226; C22B 9/225; C22B 9/228

See application file for complete search history.

(56) References Cited

FOREIGN PATENT DOCUMENTS

| | | | |
|---|---|---|---|
| JP | 61-231151 A | | 10/1986 |
| JP | 62-56561 A | | 3/1987 |
| JP | 1-156457 A | | 6/1989 |
| JP | 9-314278 A | | 12/1997 |
| JP | 2007-84855 A | | 4/2007 |
| JP | 2007-332420 A | | 12/2007 |
| WO | WO 2010/090353 A1 | | 8/2010 |
| WO | WO 2014/163087 A1 | | 10/2014 |
| WO | WO 2014163089 | * | 10/2014 |

OTHER PUBLICATIONS

First Japanese Office Action and English Translation for Corresponding Application No. 2014-549246, dated Oct. 27, 2015.
International Preliminary Report on Patentability (PCT/IPEA/409), issued in PCT/JP2014/076076, dated Aug. 2, 2016.
International Search Report, issued in PCT/JP2014/076076, dated Dec. 22, 2014.
Second Japanese Office Action and English Translation for Corresponding Application No. 2014-549246, dated May 31, 2016.
Written Opinion of the International Searching Authority (PCT/ISA/237), issued in PCT/JP2014/076076, dated Dec. 22, 2014.
Korean Office Action for Application No. 10-2017-7008304, dated Jan. 2, 2018, with English language translation.
Extended European Search Report dated Feb. 27, 2018 for corresponding European Application No. 14903056.1.
Chinese Office Action and Search Report, dated Oct. 9, 2018 for corresponding Chinese Application No. 201480082251.7, with a partial English translation of the Chinese Office Action.
Eurasian Office Action, dated Nov. 26, 2018, for corresponding Eurasian Application No. 201790488, with an English translation.
European Office Action, dated Feb. 1, 2019, for corresponding European Application No. 14903056.1.
Indian Office Action, dated Dec. 13, 2018, for corresponding Indian Application No. 201717008228, along with an English translation.
Eurasian Office Action for corresponding Eurasian Application No. 201790488/31, dated Mar. 28, 2019, with partial English translation.

* cited by examiner

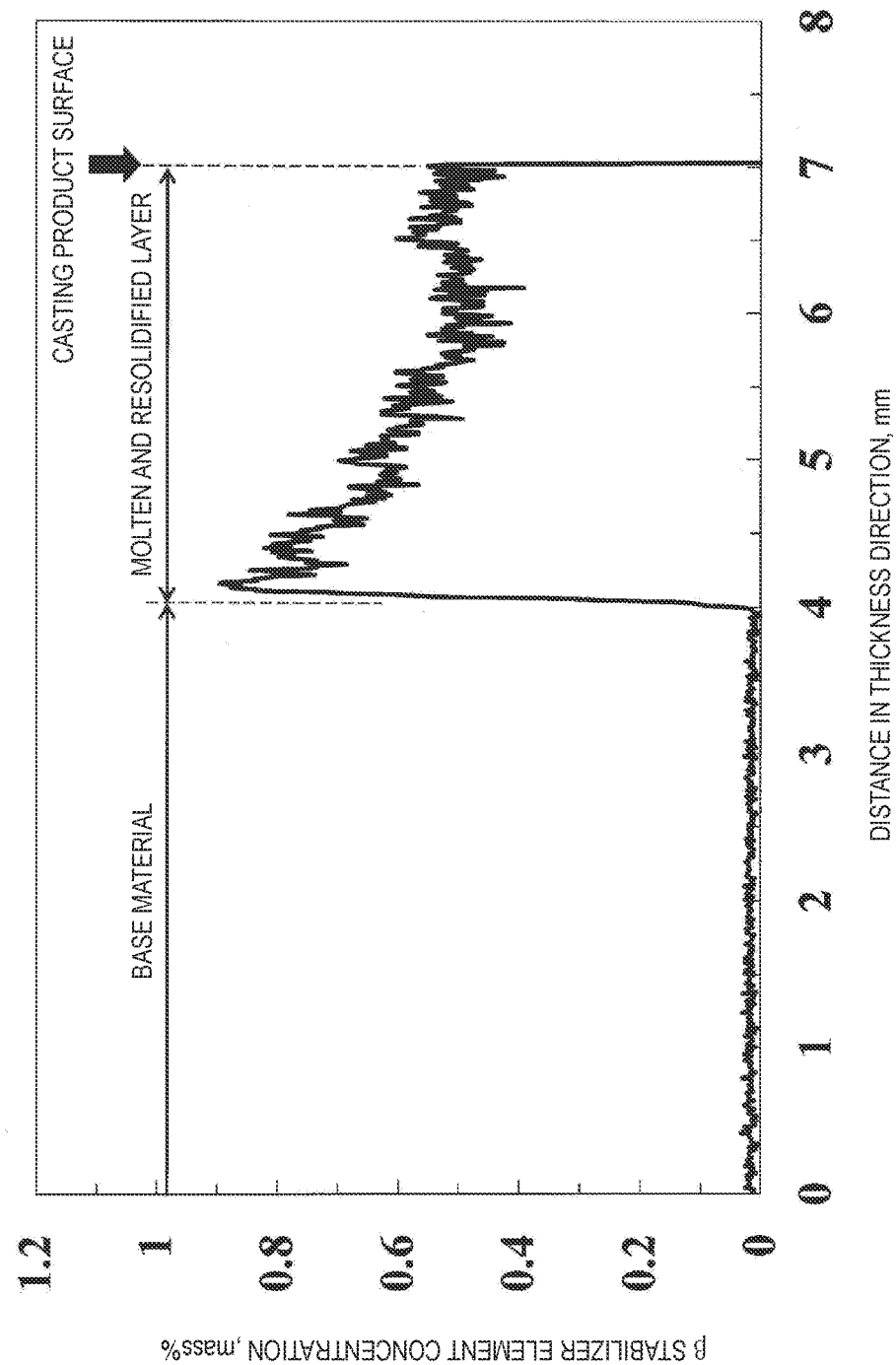

TITANIUM CASTING PRODUCT FOR HOT ROLLING AND METHOD FOR PRODUCING THE SAME

TECHNICAL FIELD

The present invention relates to a method for producing a titanium cast product for hot rolling made of commercially pure titanium, particularly to a titanium cast product that can keep excellent surface properties after hot rolling even when a breakdown process such as slabing, forging, or the like is omitted and a method for producing the same.

BACKGROUND ART

In general, commercially pure titanium uses titanium sponge or titanium scrap as a raw material. It is melted by non-consumable electrode arc remelting, electron-beam remelting, plasma arc remelting, or the like into a titanium ingot (titanium cast product). Non-consumable arc remelting uses titanium sponge pressed into a briquette as an electrode, and causes arc discharge between the electrode and a mold to melt the electrode itself and cast it into the mold, thereby obtaining an ingot. Therefore, uniform discharge between the electrode and the mold is necessary, which limits the shape of the mold to a cylindrical shape; accordingly, the shape of the ingot after casting is a cylindrical shape. On the other hand, electron-beam remelting and plasma arc remelting, which use electron beams and plasma arc, respectively, differ in melting method, but both the methods pour molten titanium melted on a hearth into a mold, and this allows free selection of the shape of the mold; thus, it is possible to produce ingots with various shapes, such as a rectangular shape and a billet shape, as well as a cylindrical shape.

In the current titanium material production process, after this, a hot working process, such as slabing or forging, which is called an ingot breakdown process, is carried out and then hot rolling is performed; the breakdown process is necessary. However, according to the shapes, it is considered that the breakdown process can be omitted in producing a sheet material for a rectangular ingot (slab) and in producing a bar or a wire rod for a cylindrical ingot and a billet, and a technology of performing hot rolling without the breakdown process has been under study. If this technology is established, it can be expected that cost will be improved by omission of a process and an enhancement in yield.

However, a titanium cast product produced by electron-beam remelting or plasma arc remelting is as-cast and therefore comprises coarse grains with sizes as large as several tens of millimeters. In regard to such a titanium cast product, when hot rolling is performed without a breakdown process, because of the coarse grains, the influence of deformation anisotropy in a grain and between crystal grains causes surface unevenness, leading to surface defects. In order to remove surface defects that occur in hot rolling, it is necessary to increase the amount of pickling of the surface of a hot-rolled material in a pickling process, which is the following process, and accordingly yield is worsened and may result in an increase in cost.

Accordingly, for a titanium ingot produced by electron-beam remelting or plasma arc remelting, while it is expected that cost will be improved by omission of a breakdown process carried out by slabing, forging, or the like, there is a concern that an increase in surface defects may cause an increase in cost. This has inhibited practical utilization of a titanium cast product obtained without a breakdown process.

Patent Literature 1 discloses a method that provides an excellent casting surface and can improve surface defects after hot rolling even when an ingot breakdown process is omitted in the following case: in a cross-sectional microstructure of a titanium slab produced in an electron beam remelting furnace and extracted directly from a mold, an angle θ formed by the solidification direction from the surface layer toward the interior and the casting direction of the slab is in the range of 45 to 90°, or in the crystal orientation distribution of the surface layer, an angle formed by the c-axis of hcp and the normal to the slab surface layer is in the range of 35 to 90°. That is, controlling the shape and crystal orientation of crystal grains of the surface suppresses occurrence of defects due to coarse crystal grains.

In Patent Literature 2, as a method for directly performing hot rolling without an ingot breakdown process for a titanium material, the surface layer at a surface corresponding to a surface to be rolled is subjected to melting and resolidification by high-frequency induction heating, arc heating, plasma heating, electron-beam heating, laser heating, and the like; thus, a portion from the surface layer to a depth of 1 mm or more undergoes grain refining. This slab surface layer is quenched and solidified to have fine and irregular crystal orientation distribution, which prevents occurrence of surface defects.

CITATION LIST

Patent Literature

Patent Literature 1: WO/2010/090353
Patent Literature 2: JP 2007-332420A

SUMMARY OF INVENTION

Technical Problem

The present invention provides a titanium cast product and a method for producing the same, where the titanium cast product is obtained without either any need of a cutting and conditioning process for an as-cast titanium cast product surface layer or any breakdown process and the occurrence of the surface defects is suppressed in a titanium material after subsequent hot rolling.

Solution to Problem

The present inventors carried out extensive studies in order to achieve the object. The resulting findings are as follows. When an as-cast titanium cast product produced by electron-beam remelting or plasma arc remelting, as a method for melting a titanium cast product made of pure titanium, is subjected to hot rolling without a breakdown process, which has been conventionally necessary, a material (powder, a chip, wire, or foil) containing a β stabilizer element is placed or applied on the surface layer at a surface to be rolled of the as-cast titanium cast product, and the surface layer of a titanium material is melted with the material as a pre-process of the hot rolling. In this manner, a layer having a higher β stabilizer element concentration than a base material, i.e., a β stabilizer element-rich layer, is formed in the surface layer of the titanium material. This makes it possible to keep excellent surface properties after hot rolling.

That is, the present invention is as described below.

(1)

A titanium cast product made of commercially pure titanium, comprising:

a layer containing one or more kinds of β stabilizer element in a range of 1 mm or more in depth at a surface serving as a surface to be rolled, wherein an average value of β stabilizer element concentration in a range of within 1 mm in depth is higher than β stabilizer element concentration in a base material by, in mass %, equal to or more than 0.08 mass % and equal to or less than 1.50 mass %.

(2)

The titanium cast product according to (1), wherein the β stabilizer element (s) is/are one or more of Fe, Ni, and Cr.

(3)

The titanium cast product according to (1), containing one or more kinds of α stabilizer elements or neutral elements together with the β stabilizer element (s).

(4)

A method for producing a titanium cast product, comprising melting a surface serving as a surface to be rolled of a titanium cast product together with a material containing a β stabilizer element and then solidifying the surface to make an average value of β stabilizer element concentration in a range of within 1 mm in depth higher than β stabilizer element concentration in a base material by, in mass %, equal to or more than 0.08 mass % and equal to or less than 1.50 mass %, the titanium cast product being made of commercially pure titanium.

(5)

The method for producing a titanium cast product according to (4), wherein the material containing the β stabilizer element is in a form of any of powder, a chip, wire, and foil.

(6)

The method for producing a titanium cast product according to (4), wherein the surface serving as the surface to be rolled of the titanium cast product is melted by electron-beam heating or plasma heating, the titanium cast product being made of commercially pure titanium.

Advantageous Effects of Invention

With a titanium cast product according to the present invention, even when hot rolling is performed without a breakdown process such as slabing, forging, or the like, which has been conventionally necessary, a titanium material having surface properties equivalent to those of a conventional material can be produced. A reduction in heating time due to omission of the breakdown process, a reduction in cutting treatment achieved by smoothing of the surface layer of the titanium cast product due to surface layer melting, a reduction in the amount of pickling due to an enhancement in surface properties of the titanium material after hot rolling, and the like lead to an enhancement in yield, producing an effect of reducing production cost; the present invention offers a great effect in industry.

BRIEF DESCRIPTION OF DRAWINGS

FIG. 1 schematically shows a change in concentration of a melted and resolidified layer.

DESCRIPTION OF EMBODIMENTS

Hereinafter, the present invention will be described in detail.

In the present invention, commercially pure titanium includes commercially pure titanium specified by classes 1 to 4 of the JIS standard, and classes 1 to 4 of the ASTM standard and 3.7025 of the DIN standard corresponding thereto. That is, commercially pure titanium of interest in the present invention can be said to be titanium consisting of C: equal to or less than 0.1 mass %, H: equal to or less than 0.015 mass %, O: equal to or less than 0.4 mass %, N: equal to or less than 0.07 mass %, Fe: equal to or less than 0.5mass %, and the balance: Ti. Note that Fe contained in a large amount as compared with other β stabilizer elements in commercially pure titanium is substantially contained in an amount of approximately 0.020 to 0.05 mass % in JIS classes 1 and 2, and approximately 0.08 mass % in JIS class 3.

Titanium cast products of interest in the present invention include rectangular ingots (slab ingots), cylindrical ingots, and billet ingots. The surface layer of a titanium cast product with such a shape is melted together with a material containing a β stabilizer element, so that surface defects are suppressed for a titanium material after hot rolling.

In the present invention, only a surface layer part of an as-cast titanium cast product is heated to be melted 1 mm or more in depth. The surface layer part of the titanium cast product melted in this manner is quenched and resolidified after melting, and a cross-sectional microstructure of a melted and resolidified layer cooled to room temperature (a solidified layer that is obtained by melting only a surface layer part of an as-cast titanium cast product by heating and then performing quenching and resolidification in this manner is called a "melted and resolidified layer") is a fine acicular microstructure. Moreover, in melting the surface layer, the surface layer of a base material is melted concurrently with a β stabilizer element; thus, the β stabilizer element concentration in the melted and resolidified layer becomes higher than that in the base material, and consequently, an enhancement in hardenability due to the addition of the β stabilizer element makes the melted and resolidified layer have an even finer microstructure. The "enhancement in hardenability" here refers to low temperature transformation achieved by shifting the nose of transformation in continuous cooling to the long-time side by containing the β stabilizer element in the surface layer of the titanium cast product. The purpose of the low temperature transformation is to increase nucleation sites to make crystal grains finer.

As will be described later, in the present invention, the formed melted and resolidified layer includes a deep portion and a shallow portion. In the present invention, the specified depth of the melted and resolidified layer is 1 mm or more; this depth refers to the depth of the shallowest portion as viewed in a cross-section in a direction perpendicular to a scanning direction of a molten bead.

Normally, commercially pure titanium is subjected to hot rolling in a single-phase region, which is below β transformation point temperature. Therefore, a titanium cast product is heated to α-phase high temperature region, which is the temperature of heating for hot rolling. In general, commercially pure titanium contains, as an alloy element, a β stabilizer element, such as Fe, in a trace amount, and thus α+β temperature region slightly exists. In normal commercially pure titanium, however, the α+β temperature region is a very narrow temperature region of only several tens of degrees. In contrast, in a titanium cast product obtained by adding a β stabilizer element to the surface layer of the above-described titanium cast product and melting the β stabilizer element concurrently with the surface layer of the titanium material and performing resolidification, the β stabilizer element concentration in the surface layer is higher than that in the base material. The stability of β phase is therefore high in the melted and resolidified layer, which widens the temperature region of the α+β region; thus, the interior of the melted and resolidified layer can be brought into the state of the α+β region in heating for hot rolling. Since the β phase forms in a grain boundary of a phase, grain growth of the a phase is suppressed, so that fine crystal grains after the melting and resolidification can be maintained until hot rolling after heating for hot rolling. Accordingly, unevenness of the surface of the titanium material due to coarse crystal grains can be suppressed, and thus a titanium hot-rolled material without surface defects can be produced.

In addition, when melting is performed as described above, the β stabilizer element is not dispersed uniformly at the molten surface of the titanium cast product, and consequently a region with a high concentration of the element forms partially, in which portion the temperature region of the α+β region can be further widened, so that grain growth of the a phase in heating for hot rolling can be further suppressed.

When the surface layer of the titanium cast product is remelted 1 mm or more in depth as described above and then solidified, a portion from the surface layer to a depth of 1 mm or more has a fine acicular microstructure obtained by solidification after remelting, whereas the center side in the sheet thickness direction of the titanium material with respect to the melted and resolidified layer and a portion thermally influenced thereby keeps the microstructure as-cast. At least the surface layer corresponding to a surface to be rolled of the titanium cast product is remelted together with a material containing a β stabilizer element and then solidified, so that the average value of concentrations of the β stabilizer element in a portion from the surface layer to a depth of 1 mm in the melted and resolidified layer is higher than the β stabilizer element concentration in the base material by, in mass %, equal to or more than 0.08 mass % and equal to or less than 1.50 mass %. As the stabilizer element, a plurality of β stabilizer elements may be added in combination, in which case the β stabilizer element concentration refers to the sum of the concentrations of the contained β stabilizer elements. If a difference in β stabilizer element concentration between the base material and the melted and resolidified layer is less than 0.08 mass %, the addition of the β stabilizer element does not sufficiently provide the effects of enhancing hardenability and suppressing crystal grain growth, and surface defects easily occur in the titanium material after hot rolling. In order to further exert the effect of suppressing surface defects, the β stabilizer element concentration difference preferably exceeds 0.2 mass %, and it is most preferable that the β stabilizer element difference exceed 0.5 mass %. Moreover, when the difference in β stabilizer element concentration between the base material and the melted and resolidified layer is within the aforementioned range, the β stabilizer element-enriched layer at the surface layer is removed by pickling carried out by shot blasting and pickling, which are processes after hot rolling, and the β stabilizer element enriched in the melted and resolidified layer is detoxified. That is, the processes of shot blasting and pickling removes the β stabilizer element-enriched layer, making it possible to obtain components and mechanical properties equivalent to those of a cold-rolled sheet produced by a normal method. However, if the difference in β stabilizer element concentration between the base material and the melted and resolidified layer is more than 1.50 mass %, the volume fraction of the β phase in the surface layer of the titanium cast product increases in hot rolling, so that a slab surface layer portion is oxidized intensely as compared with the base material. Furthermore, the increase in the β stabilizer element concentration in the surface layer of the titanium cast product may lead to an increase in the hardness of the melted and resolidified layer as compared with the base material, causing surface crack or the like in hot rolling. These causes make it necessary to increase the amount of pickling of the surface in a pickling process, which significantly reduces yield. In addition, it becomes difficult to detoxify the β stabilizer element-enriched layer in a post-process. Hence, the average value of concentrations of the β stabilizer element in a portion from the surface layer to a depth of 1 mm is made to differ from the β stabilizer element concentration in the base material by 1.50 mass % or less. In addition, although the specified melting depth is 1 mm or more, too deep melting depth may cause the β stabilizer element-enriched layer to remain after the processes of shot blasting and pickling; hence, it is desirable that the melting depth be approximately 5 mm or less.

Moreover, normally, a titanium cast product in casting undergoes solidification from a surface layer part of the titanium cast product in contact with the mold; therefore, components slightly differ between the surface layer and the interior of the titanium cast product depending on distribution of a solute for each element. Since a β stabilizer element, such as Fe, exhibits normal segregation, in solidification or in transformation, the Fe concentration in the surface layer part of the titanium cast product decreases and the Fe concentration tends to become higher toward the interior of the titanium cast product. Therefore, it is very effective to make the β stabilizer element concentration in the melted and resolidified layer equivalent to or higher than that in the base material by melting the β stabilizer element and the base material concurrently.

In addition, in casting of the titanium material, components are adjusted to be uniform in the entire slab by controlling input of raw materials. However, fluctuation of components or the like may occur partially. Therefore, even in commercially pure titanium, JIS class 3 or JIS class 4, which originally has a high content of Fe, which is a β stabilizer element, a region exists in which crystal grains are not sufficiently fine in the melted and resolidified layer, according to component fluctuation of Fe, and surface defects often occur partially after hot rolling. Hence, it is very effective to add a β stabilizer element in melting and resolidification to raise the amount of the β stabilizer element added; thus, partial surface defects can also be suppressed.

In a cross-section in a direction perpendicular to a scanning direction of a molten bead, the melted and resolidified layer tends to be deepest at the center of the molten bead in remelting of the surface layer of the titanium cast product, and, when molten beads are overlapped, is shallowest at a portion midway between adjacent molten beads, the deepest portion and the shallowest portion being repeated periodically. Here, if a difference between the deepest portion and the shallowest portion is large, this difference causes a difference in deformation resistance in hot rolling, which may cause defects. Hence, it is desirable that the above difference be less than 2 mm. Note that in the present invention, the specified depth of the melted and resolidified layer is 1 mm or more; this depth refers to the depth of the shallowest portion as viewed in a cross-section in a direction perpendicular to a scanning direction of a molten bead.

Description will be given on a method for measuring the depth of the melted and resolidified layer and ununiformity of the melted and resolidified layer. A portion cut out from the surface layer portion of the titanium cast product in a cross-section in a direction perpendicular to a scanning direction of a molten bead is used as an embedding and polishing sample for scanning electron microscopy (SEM)/ an electron probe microanalyser (EPMA); thus, the melted and resolidified layer can be distinguished easily. In the present invention, since the depth of the melted and resolidified layer is defined as the depth of the shallowest portion, a melting depth can be simply obtained by elemental mapping analysis. FIG. 1 shows an example of measured values of changes in concentration of the base material and the melted and resolidified layer. This is obtained by linear analysis of β stabilizer element concentration in the thickness direction from a base material portion near the surface layer at a surface to be rolled of the titanium cast product toward the surface to be rolled. In the base material, the β stabilizer element concentration is low and substantially uniform, whereas in the melted and resolidified layer, the β stabilizer element concentration is high and also exhibits concentration fluctuation, which indicates ununiformity.

Examples of the β stabilizer element include V, Mo, Fe, Cr, Mn, Ta, Nb, Ni, Co, Cu, and W. In titanium, however, an element such as W or Ta having a high melting point causes high density inclusion (HDI), and serves as a starting point of fatigue when it remains in the titanium material without being melted or without being diffused sufficiently; therefore, such an element needs to be used with care. Moreover, Mo, Nb, and the like have lower melting points than W and Ta, but still have melting points of 2000° C. or higher; therefore, when using Mo or Nb, it is desirable to alloy it with an element such as Ti in advance to make the melting point lower and add the resulting alloy. β stabilizer elements can be classified into a complete solid solution type, such as V, Mo, Ta, and Nb, and an eutectoid type, such as Fe, Cr, Mn, Co, Ni, and Cu. β stabilizer elements of the eutectoid type have low solid solubility but have high β stabilizing ability; therefore, addition of a β stabilizer element of the eutectoid type is effective even in a small amount. In regard to Fe, Cr, Mn, Co, Ni, and Cu, which are of the eutectoid type, surface defects after hot rolling can be suppressed when β stabilizer element concentration in the melted and resolidified layer is higher than that in the base material by approximately 0.08 to 0.60 mass %; hence, this range is preferable. In regard to V, Mo, Ta, and Nb, which are of the complete solid solution type, which have low β stabilizing ability as compared with the eutectoid type, an effect is more easily exerted by adding a β stabilizer element in a large amount such that β stabilizer element concentration in the melted and resolidified layer is higher than that in the base material by approximately 0.60 to 1.50 mass %. Even when a β stabilizer element of the eutectoid type is used, since quenching is performed in solidification after remelting, cooling rate is high and no precipitate forms, and also in heating for hot rolling, no precipitate forms because the state is the α+β region. Furthermore, the material containing the β stabilizer element may contain an α stabilizer element typified by Al, or a neutral element, such as Sn or Zr. Either one or both of an α stabilizer element and a neutral element may be contained. The total amount of an α stabilizer element and a neutral element in the melted and resolidified layer is preferably 2.0 mass % or less with respect to the base material. Fe, Ni, and Cr, which are relatively inexpensive β stabilizer elements, are preferably used as the material to be melted together with the surface layer of the as-cast titanium cast product. It is also effective to use Fe powder or the like or stainless steel powder or the like, or utilize crushed scrap of ordinary steel or stainless steel. Similarly, crushed scrap of titanium alloy may be used.

The material used for adding the β stabilizer element to the surface layer of the casting product may have any of the shapes of powder, a chip, wire, and foil, and it is desirable that the material be in a small piece. It is effective to use any of the following materials: powder with a particle size in a range of 1 μm to 0.5 mm, a chip with a size in a range of 2 mm square to 5 mm square, wire with a diameter in a range of 0.5 mm to 5 mm, and foil with a thickness in a range of 1 μm to 0.1 mm. Such a material is disposed uniformly on the surface of the casting product when placed or applied on the surface of the casting product; thus, a region with the same concentration as the concentration in the base material can be reduced at the surface layer of the titanium cast product, which provides a titanium cast product with more excellent surface properties.

Methods for melting the surface layer together with the stabilizer element include electron-beam heating, arc heating, laser heating, and induction heating. Titanium is active metal, and when the surface layer is melted in atmospheric air, a molten portion is oxidized significantly. Hence, the following methods are suitable: electron-beam heating, arc heating (in particular, a heating method using inert gas, such as plasma arc heating or tungsten inert gas (TIG) welding), laser heating, and the like, which can perform treatment in a vacuum atmosphere or an inert gas atmosphere. The aforementioned treatment can be performed by any of these methods. Of these, electron-beam heating or plasma arc heating, which can apply high energy at once, is suitable for industry and preferred to be used.

EXAMPLES

Hereinafter, the present invention will be described in more detail in Examples.

TABLE 1

| No. | Glade | Form of additive | Difference in β stabilizer element concentration (mass %) between base material and molten and resolidified layer (surface layer 1 mm) | | | | Melting method | Depth of molten layer (mm) | Slabbing | Surface defects | Evaluation | Remarks |
| | | | Fe | Cr | Ni | Fe + Cr + Ni | | | | | | |
| --- | --- | --- | --- | --- | --- | --- | --- | --- | --- | --- | --- | --- |
| 1 | Pure titanium JIS class 1 | none | 0.00 | — | — | 0.00 | none | 0 | Yes | minor | Good | Reference Example |
| 2 | Pure titanium JIS class 1 | none | 0.00 | — | — | 0.00 | none | 0 | No | coarse | Poor | Comparative Example |

TABLE 1-continued

| No. | Glade | Form of additive | Fe | Cr | Ni | Fe + Cr + Ni | Melting method | Depth of molten layer (mm) | Slabbing | Surface defects | Evaluation | Remarks |
|---|---|---|---|---|---|---|---|---|---|---|---|---|
| 3 | Pure titanium JIS class 1 | none | 0.00 | | | 0.00 | electron beam | 2 | No | partially coarse defects | Poor | Comparative Example |
| 4 | Pure titanium JIS class 1 | Fe powder | 0.07 | — | — | 0.07 | electron beam | 2 | No | partially coarse defects | Poor | Comparative Example |
| 5 | Pure titanium JIS class 1 | Fe powder | 0.22 | — | — | 0.22 | electron beam | 0.5 | No | partially coarse defects | Poor | Comparative Example |
| 6 | Pure titanium JIS class 1 | Fe powder | 0.08 | — | — | 0.08 | electron beam | 3 | No | partially somewhat coarse defects | Fair | Example |
| 7 | Pure titanium JIS class 1 | Fe powder | 0.87 | — | — | 0.87 | electron beam | 1 | No | minor | Good | Example |
| 8 | Pure titanium JIS class 2 | Fe powder | 1.50 | — | — | 1.50 | electron beam | 5 | No | minor | Good | Example |
| 9 | Pure titanium JIS class 2 | Fe powder | 0.49 | — | — | 0.49 | electron beam | 7 | No | minor | Fair | Example |
| 10 | Pure titanium JIS class 1 | Fe powder | 1.65 | — | — | 1.65 | electron beam | 4 | No | partially coarse defects | Poor | Comparative Example |
| 11 | Pure titanium JIS class 1 | Fe chip | 0.13 | — | — | 0.13 | electron beam | 3 | No | partially somewhat coarse defects | Fair | Example |
| 12 | Pure titanium JIS class 2 | Fe chip | 1.30 | — | — | 1.30 | electron beam | 3 | No | minor | Good | Example |
| 13 | Pure titanium JIS class 1 | Fe wire | 0.11 | — | — | 0.11 | electron beam | 3 | No | partially somewhat coarse defects | Fair | Example |
| 14 | Pure titanium JIS class 1 | Fe wire | 1.39 | — | — | 1.39 | electron beam | 3 | No | minor | Good | Example |
| 15 | Pure titanium JIS class 1 | Fe foil | 0.20 | — | — | 0.20 | electron beam | 3 | No | minor | Good | Example |
| 16 | Pure titanium JIS class 1 | Fe foil | 1.36 | — | — | 1.36 | electron beam | 3 | No | minor | Good | Example |
| 17 | Pure titanium JIS class 1 | Fe powder | 0.14 | — | — | 0.14 | plasma arc | 4 | No | minor | Good | Example |
| 18 | Pure titanium JIS class 2 | Fe powder | 1.35 | — | — | 1.35 | plasma arc | 4 | No | minor | Good | Example |
| 19 | Pure titanium JIS class 1 | SUS304 powder | 0.05 | 0.01 | 0.01 | 0.07 | electron beam | 2 | No | partially coarse defects | Poor | Comparative Example |
| 20 | Pure titanium JIS class 1 | SUS304 powder | 0.06 | 0.02 | 0.01 | 0.09 | electron beam | 2 | No | partially somewhat coarse defects | Fair | Example |
| 21 | Pure titanium JIS class 1 | SUS304 powder | 0.14 | 0.04 | 0.02 | 0.20 | electron beam | 2 | No | minor | Good | Example |
| 22 | Pure titanium JIS class 2 | SUS304 powder | 0.98 | 0.24 | 0.11 | 1.33 | electron beam | 2 | No | minor | Good | Example |
| 23 | Pure titanium JIS class 1 | SUS430 powder | 0.06 | 0.01 | — | 0.07 | electron beam | 2 | No | partially coarse defects | Poor | Comparative Example |
| 24 | Pure titanium JIS class 1 | SUS430 powder | 0.08 | 0.01 | — | 0.09 | electron beam | 2 | No | partially somewhat coarse defects | Fair | Example |
| 25 | Pure titanium JIS class 1 | SUS430 powder | 0.65 | 0.12 | — | 0.77 | electron beam | 2 | No | minor | Good | Example |
| 26 | Pure titanium JIS class 2 | SUS430 powder | 1.16 | 0.22 | — | 1.38 | electron beam | 2 | No | minor | Good | Example |
| 27 | Pure titanium JIS class 1 | Cr chip | 0.00 | 0.12 | — | 0.12 | electron beam | 3 | No | partially somewhat coarse defects | Fair | Example |
| 28 | Pure titanium JIS class 1 | Cr chip | 0.00 | 0.25 | — | 0.25 | electron beam | 3 | No | minor | Good | Example |
| 29 | Pure titanium JIS class 2 | Cr chip | 0.00 | 1.70 | — | 1.70 | electron beam | 3 | No | partially coarse defects | Poor | Comparative Example |
| 30 | Pure titanium JIS class 1 | Ni chip | 0.00 | — | 0.05 | 1.05 | electron beam | 3 | No | partially coarse defects | Poor | Comparative Example |
| 31 | Pure titanium JIS class 1 | Ni chip | 0.00 | — | 0.16 | 0.16 | electron beam | 3 | No | partially somewhat coarse defects | Fair | Example |
| 32 | Pure titanium JIS class 2 | Ni chip | 0.00 | — | 1.20 | 1.20 | electron beam | 3 | No | minor | Good | Example |
| 33 | Pure titanium JIS class 1 | none | 0.00 | — | — | 0.00 | none | 0 | Yes | minor | Good | Reference Example |
| 34 | Pure titanium JIS class 1 | Fe powder | 0.06 | — | — | 0.06 | electron beam | 3 | No | partially coarse defects | Poor | Comparative Example |
| 35 | Pure titanium JIS class 2 | Fe powder | 1.30 | — | — | 1.30 | electron beam | 3 | No | minor | Good | Example |
| 36 | Pure titanium JIS class 1 | Cr chip | 0.00 | 0.35 | — | 0.35 | electron beam | 3 | No | minor | Good | Example |
| 37 | Pure titanium JIS class 1 | Ni chip | 0.00 | — | 1.47 | 1.47 | electron beam | 3 | No | minor | Good | Example |

TABLE 2

Difference in β-stabilizer element concentration (mass) between base material and molten and resolidified layer (surface ayer 1 mm)

| No. | Glade | Form of additive | Fe | Mo | V | Ta | Mn | Nb | Co | Cu | Cr | Sum | Surface defects | Evaluation | Remarks |
|---|---|---|---|---|---|---|---|---|---|---|---|---|---|---|---|
| 38 | Pure titanium JIS class 1 | Ti—Mo chip | 0.00 | 0.06 | — | — | — | — | — | — | — | 0.06 | partially coarse defects | Poor | Comparative Example |
| 39 | Pure titanium JIS class 1 | Ti—Mo chip | 0.00 | 0.13 | — | — | — | — | — | — | — | 0.13 | partially somewhat coarse defects | Fair | Example |
| 40 | Pure titanium JIS class 2 | Ti—Mo chip | 0.00 | 0.32 | — | — | — | — | — | — | — | 0.32 | partially somewhat coarse defects | Fair | Comparative Example |
| 41 | Pure titanium JIS class 2 | Ti—Mo chip | 0.00 | 0.60 | — | — | — | — | — | — | — | 0.60 | minor | Good | Comparative Example |
| 42 | Pure titanium JIS class 1 | Ti—Mo chip | 0.00 | 1.57 | — | — | — | — | — | — | — | 1.57 | partially coarse defects | Poor | Comparative Example |
| 43 | Pure titanium JIS class 1 | V chip | 0.00 | — | 0.07 | — | — | — | — | — | — | 0.07 | partially coarse defects | Poor | Comparative Example |
| 44 | Pure titanium JIS class 1 | V chip | 0.00 | — | 0.24 | — | — | — | — | — | — | 0.24 | partially somewhat coarse defects | Fair | Example |
| 45 | Pure titanium JIS class 2 | V chip | 0.00 | — | 0.67 | — | — | — | — | — | — | 0.67 | minor | Good | Example |
| 46 | Pure titanium JIS class 1 | Mn chip | 0.00 | — | — | — | 0.05 | — | — | — | — | 0.05 | partially coarse defects | Poor | Comparative Example |
| 47 | Pure titanium JIS class 1 | Mn chip | 0.00 | — | — | — | 0.22 | — | — | — | — | 0.22 | minor | Good | Example |
| 48 | Pure titanium JIS class 2 | Mn chip | 0.00 | — | — | — | 1.34 | — | — | — | — | 1.34 | minor | Good | Example |
| 49 | Pure titanium JIS class 1 | Fe—Nb chip | 0.10 | — | — | — | — | 0.18 | — | — | — | 0.28 | minor | Good | Example |
| 50 | Pure titanium JIS class 1 | Fe—Nb chip | 0.25 | — | — | — | — | 0.49 | — | — | — | 0.74 | minor | Good | Example |
| 51 | Pure titanium JIS class 2 | Fe—Nb chip | 0.54 | — | — | — | — | 1.00 | — | — | — | 1.54 | partially coarse defects | Poor | Comparative Example |
| 52 | Pure titanium JIS class 1 | Co chip | 0.00 | — | — | — | — | — | 0.07 | — | — | 0.07 | partially coarse defects | Poor | Comparative Example |
| 53 | Pure titanium JIS class 1 | Co chip | 0.00 | — | — | — | — | — | 0.23 | — | — | 0.23 | minor | Good | Example |
| 54 | Pure titanium JIS class 2 | Co chip | 0.00 | — | — | — | — | — | 0.11 | — | — | 0.11 | minor | Good | Example |
| 55 | Pure titanium JIS class 1 | Cu chip | 0.00 | — | — | — | — | — | — | 0.07 | — | 0.07 | partially coarse defects | Poor | Comparative Example |
| 56 | Pure titanium JIS class 1 | Cu chip | 0.00 | — | — | — | — | — | — | 0.16 | — | 0.16 | minor | Good | Comparative Example |
| 57 | Pure titanium JIS class 2 | Cu chip | 0.00 | — | — | — | — | — | — | 1.28 | — | 1.28 | minor | Good | Comparative Example |
| 58 | Pure titanium JIS class 1 | 6-4V chip | 0.00 | — | 0.06 | — | — | — | — | — | — | 0.06 | partially coarse defects | Poor | Comparative Example |
| 59 | Pure titanium JIS class 1 | 6-4V chip | 0.00 | — | 0.12 | — | — | — | — | — | — | 0.12 | partially somewhat coarse defects | Fair | Example |
| 60 | Pure titanium JIS class 2 | 6-4V chip | 0.00 | — | 0.64 | — | — | — | — | — | — | 0.64 | minor | Good | Comparative Example |
| 61 | Pure titanium JIS class 1 | 15-3-3-3 chip | 0.00 | — | 0.05 | — | — | — | — | — | 0.01 | 0.06 | partially coarse defects | Poor | Comparative Example |
| 62 | Pure titanium JIS class 1 | 15-3-3-3 chip | 0.00 | — | 0.12 | — | — | — | — | — | 0.02 | 0.14 | partially somewhat coarse defects | Fair | Example |
| 63 | Pure titanium JIS class 2 | 15-3-3-3 chip | 0.00 | — | 0.56 | — | — | — | — | — | 0.12 | 0.68 | minor | Good | Example |
| 64 | Pure titanium JIS class 3 | Fe chip | 0.05 | — | — | — | — | — | — | — | — | 0.05 | partially coarse defects | Poor | Comparative Example |
| 65 | Pure titanium JIS class 3 | Fe chip | 0.86 | — | — | — | — | — | — | — | — | 0.86 | minor | Good | Example |
| 66 | Pure titanium JIS class 3 | Fe chip | 1.25 | — | — | — | — | — | — | — | — | 1.25 | minor | Good | Example |
| 67 | Pure titanium JIS class 4 | Fe chip | 0.06 | — | — | — | — | — | — | — | — | 0.06 | partially coarse defects | Poor | Comparative Example |
| 68 | Pure titanium JIS class 4 | Fe chip | 0.96 | — | — | — | — | — | — | — | — | 0.96 | minor | Good | Comparative Example |

In each of Reference Examples, Examples, and Comparative Examples shown in Tables 1 and 2, a titanium cast product was produced using a rectangular mold by electron-beam remelting. Note that in Examples and Comparative Examples described below, unless otherwise specified, description is given on a case where a hot-rolled sheet is produced from an as-cast titanium slab produced using a rectangular mold. A hot-rolled sheet with a thickness of 4 mm was produced by hot rolling from a titanium cast product with a size of thickness 200 mm×width 1000 mm×length 4500 mm. As classes of titanium, commercially pure titanium JIS class 1, JIS class 2, JIS class 3, and JIS class 4 were used. As a material containing a β stabilizer element, any of powder (particle size: 100 μm or less), a chip (2 mm square, 1 mm thick), wire (diameter: 1 mm), and foil (20 μm) was used. In containing the β stabilizer element, the material containing the β stabilizer element was placed or applied on the as-cast surface of an as-cast titanium cast product (slab). A slab surface layer was heated from above the material, and a surface to be rolled was entirely treated by scanning a portion to be heated with electron beams and plasma arc; thus, the material containing the β stabilizer element and the surface to be rolled included no portion remaining unmelted. In addition, an as-cast titanium cast product with a relatively excellent casting surface was used to prevent occurrence of an unmelted portion due to the casting surface in melting of the surface layer. Moreover, the material containing the β stabilizer element was dispersed uniformly on the entire surface to be rolled of the titanium cast product so that the β stabilizer element was added uniformly to the entire slab. As a method for measuring the depth of the melted and resolidified layer, a titanium cast product obtained by remelting and then solidifying the surface layer was partly cut out and subjected to polishing and etching and then was observed with an optical microscope; thus, the depth of a layer having a fine acicular microstructure (the fine acicular microstructure obtained by adding the β stabilizer element is distinguishable) was measured (the depth of the shallowest portion among the observed spots was adopted as the depth of the melted and resolidified layer). Moreover, here, analysis samples were taken from within 1 mm of the surface layer at any ten spots of the surface to be rolled of the titanium cast product and were subjected to ICP-atomic emission spectrometry, and the average value of the ten spots was obtained. In addition, for comparison, analysis samples were taken from within 20 mm of the surface layer at any three spots of the surface to be rolled of the titanium cast product before remelting of the surface layer of the titanium cast product, and were subjected to ICP-atomic emission spectrometry similarly, and the average value of the three spots was obtained. Regarding these two kinds of analysis results, a difference between the average value of the β stabilizer element concentration in a range of within 1 mm in depth of the melted and resolidified layer and the average value of the β stabilizer element concentration in the base material was investigated. The situation of occurrence of surface defects was evaluated by visually observing the surface of the titanium material (hot-rolled sheet) after the hot-rolled sheet was subjected to shot blasting and pickling after hot rolling. Pickling was performed to pickle one side of the surface to be rolled approximately 50 μm (approximately 100 μm for both sides) per once. After the sheet underwent pickling once or twice, surface properties of the hot-rolled sheet were evaluated. Note that an analysis sample was taken from within 1 mm of the surface layer for Comparative Example not subjected to surface layer melting treatment, and an analysis sample was taken from the interior of the melted and resolidified layer for Comparative Example with a thickness of the melted and resolidified layer of less than 1 mm.

First, description will be given on results for titanium cast products whose surface layers were melted together with materials containing Fe, Ni, and Cr, which are inexpensive β stabilizer elements.

In Reference Example and Comparative Example of Nos. 1 and 2, hot rolling was performed without performing surface layer melting treatment. Because of no melting treatment, the β stabilizer element concentration within 1 mm of the surface layer was equal to the β stabilizer element concentration in the base material, and a difference therebetween was less than 0.08 mass %. In Reference Example of No. 1, slabing was performed as with a normal titanium cast product. Slabing was performed from thickness 200 mm to 100 mm, and then heating was performed again and hot rolling was performed to 4 mm. Because of the slabing, there was no trouble in surface properties after hot rolling. In Comparative Example of No. 2, slabing was not performed. Since slabing was not performed either, coarse surface defects occurred in a hot-rolled sheet after pickling.

In Comparative Example of No. 3, the surface layer at the surface to be rolled was melted by electron-beam heating and a β stabilizer element was not used in melting. Although a melted and resolidified layer of 2 mm or more was obtained, the base material and the melted and resolidified layer had an equal β stabilizer element concentration because a β stabilizer element was not added, and a concentration difference therebetween was less than 0.08 mass %. On the surface of a hot-rolled sheet after hot rolling and pickling, coarse defects occurred partially.

In Comparative Examples of Nos. 4 and 5, the surface layer at the surface to be rolled was melted by electron-beam heating using Fe powder as the material containing the β stabilizer element. In Comparative Example of No. 4, the melted and resolidified layer had a higher β stabilizer element concentration than the base material, a difference therebetween being less than 0.08 mass %, and the melted and resolidified layer had a depth of 2 mm. Since Fe concentration was lower than 0.08 mass %, coarse defects occurred partially on the surface of a hot-rolled sheet after pickling. In Comparative Example of No. 5, the melted and resolidified layer had a β stabilizer element concentration higher than that of the base material by 0.22 mass %, and the melted and resolidified layer had a depth of 0.5 mm at the shallowest portion. Since the depth of the melted and resolidified layer was less than 1 mm, coarse defects occurred partially on the surface of a hot-rolled sheet after pickling. Comparative Examples of Nos. 4 and 5 exhibited improved surface properties of a hot-rolled sheet as compared with Comparative Example of No. 2, but somewhat large surface defects occurred and the quality was insufficient.

Examples of Nos. 6 to 9 and 11 to 16 and Comparative Example of No. 10 used electron-beam heating as a method for melting a slab surface layer, and underwent a hot rolling test with varying amounts and shapes of the material containing the β stabilizer element.

In Examples of Nos. 6 to 9 and Comparative Example of No. 10, powder was used as the material containing the β stabilizer element.

In Example of No. 6, the difference in β stabilizer element concentration between the base material and the melted and resolidified layer was 0.08 mass % and the melted and resolidified layer had a depth of 3 mm. Somewhat coarse surface defects occurred partially in a hot-rolled sheet after pickling, but they were of an allowable level, and very excellent surface properties were exhibited as compared with Comparative Examples of Nos. 4 and 5.

In Example of No. 7, the difference in μ stabilizer element concentration between the base material and the melted and resolidified layer was 0.87 mass % and the melted and resolidified layer had a depth of 1 mm. In Example of No. 8, the difference in β stabilizer element concentration between the base material and the melted and resolidified layer was 1.50 mass % and the melted and resolidified layer had a depth of 5 mm. In Examples of Nos. 7 and 8, surface defects after pickling were minor and very excellent surface properties were obtained.

In Example of No. 9, the difference in β stabilizer element concentration between the base material and the melted and resolidified layer was 0.49 mass % and the melted and resolidified layer had a depth of 7 mm. Although a hot-rolled sheet after pickling exhibited excellent surface properties, the depth of the melted and resolidified layer was as deep as 7 mm, which increased the number of times of pickling from that in a normal case for removal of a Fe-enriched layer; thus, yield was reduced as compared with Example of No. 8.

In Comparative Example of No. 10, the difference in β stabilizer element concentration between the base material and the melted and resolidified layer was 1.67 mass % and the melted and resolidified layer had a depth of 4 mm. Coarse defects occurred partially on the surface of a hot-rolled sheet after pickling and surface crack occurred as well, and the quality was insufficient.

In Examples of Nos. 11 to 16, the surface layer was heated to make a melted and resolidified layer at a slab surface layer have a depth of 3 mm. Examples of Nos. 11 and 12 used a chip as the material containing the β stabilizer element. Examples of Nos. 13 and 14 used wire as the material containing the β stabilizer element. Examples of Nos. 15 and 16 used foil as the material containing the β stabilizer element. In Examples of Nos. 11 to 16, the difference in β stabilizer element concentration between the base material and the melted and resolidified layer was 0.08 mass % or more, and surface defects of a hot-rolled sheet were of an allowable level and were minor.

According to the above results, excellent surface properties of a hot-rolled sheet were obtained by using any of powder, a chip, wire, and foil as the shape of the material containing the β stabilizer element.

Examples of Nos. 17 and 18 used powder as the material containing the β stabilizer element, and underwent a hot rolling test with varying a method for melting a slab surface layer. In Examples of Nos. 17 and 18, plasma arc heating was used as the method for melting the slab surface layer, and the melted and resolidified layer had a depth of 4 mm. In Examples of Nos. 17 and 18, surface defects of a hot-rolled sheet after pickling were minor, and the results were very excellent.

According to the above results, excellent surface properties of a hot-rolled sheet were obtained by using any of electron-beam heating and plasma arc heating as the method for melting the slab surface layer.

Next, description will be given on results when stainless steel containing Cr and Ni in addition to Fe was used.

In Comparative Example and Examples of Nos. 19 to 22, SUS304 powder was used as stainless steel, and the surface layer was melted by electron-beam heating to provide a melted and resolidified layer with a depth of 2 mm. In Comparative Example of No. 19, the difference in β stabilizer element concentration between the base material and the melted and resolidified layer was less than 0.08 mass %, and coarse surface defects occurred in a hot-rolled sheet. In Examples of Nos. 20 to 22, the difference in β stabilizer element concentration between the base material and the melted and resolidified layer was 0.08 mass % or more, and surface defects of a hot-rolled sheet were of an allowable level and were minor.

In Comparative Example and Examples of Nos. 23 to 26, SUS430 powder was used as stainless steel, and the surface layer was melted by electron-beam heating to provide a melted and resolidified layer with a depth of 2 mm. In Comparative Example of No. 23, the difference in β stabilizer element concentration between the base material and the melted and resolidified layer was less than 0.08 mass %, and coarse surface defects occurred in a hot-rolled sheet. In Examples of Nos. 24 to 26, the difference in β stabilizer element concentration between the base material and the melted and resolidified layer was 0.08 mass % or more, and surface defects of a hot-rolled sheet were of an allowable level and were minor.

Next, in Comparative Examples and Examples of Nos. 27 to 32, Cr or Ni was added alone. In Comparative Example and Examples of Nos. 27 to 29, a Cr chip was used, and the surface layer was melted by electron-beam heating to provide a melted and resolidified layer with a depth of 3 mm. In Examples of Nos. 27 and 28, the difference in β stabilizer element concentration between the base material and the melted and resolidified layer was equal to or more than 0.08 mass % and equal to or less than 1.5 mass %, and defects at the surface of a hot-rolled sheet were somewhat coarse partially, but the results were basically excellent. In Comparative Example of No. 29, the difference in β stabilizer element concentration between the base material and the melted and resolidified layer was 1.50 mass % or more, and coarse defects occurred partially on the surface of a hot-rolled sheet after pickling and surface crack was observed as well; worse surface properties were exhibited as compared with Examples of Nos. 27 and 28.

In Comparative Example and Examples of Nos. 30 to 32, a Ni chip was used, and the surface layer was melted by electron-beam heating to provide a melted and resolidified layer with a depth of 3 mm. In Comparative Example of No. 30, the difference in β stabilizer element concentration between the base material and the melted and resolidified layer was less than 0.08 mass %, and coarse defects occurred partially as surface defects of a hot-rolled sheet. In Examples of Nos. 31 and 32, the difference in β stabilizer element concentration between the base material and the melted and resolidified layer was within a range of 0.08 to 1.50 mass %, and in both cases surface defects of a hot-rolled sheet were of an allowable level.

In Examples and Comparative Example of Nos. 33 to 37, a wire rod with a diameter of 13 mm was produced by hot rolling from a cylindrical ingot with a size of diameter 170 mm×length 12 m obtained by electron-beam remelting. Surface defects were evaluated by visually observing a surface layer of the wire rod after pickling, as with a hot-rolled sheet.

In Reference Example of No. 33, hot rolling was performed without performing surface layer melting treatment. Because of no melting treatment, the β stabilizer element concentration within 1 mm of the surface layer was equal to the Fe concentration in the base material. Slabing was performed as with a normal titanium cast product. Because of the slabing, there was no trouble in surface properties after hot rolling.

In Comparative Example and Example of Nos. 34 and 35, Fe powder was used as the material containing the β stabilizer element. In Comparative Example of No. 34, the difference in β stabilizer element concentration between the base material and the melted and resolidified layer was less than 0.08 mass %, and coarse defects occurred partially as surface defects of a hot-rolled sheet. In Example of No. 35, the difference in β stabilizer element concentration between the base material and the melted and resolidified layer was within a range of 0.08 to 1.50 mass %, and excellent surface properties were obtained.

In Example of No. 36, a Cr chip was used as the material containing the β stabilizer element. In Example of No. 36, the difference in β stabilizer element concentration between the base material and the melted and resolidified layer was within a range of 0.08 to 1.50 mass %, and excellent surface properties were obtained.

In Example of No. 37, a Ni chip was used as the material containing the β stabilizer element. Also in Example of No. 37, the difference in β stabilizer element concentration between the base material and the melted and resolidified layer was within a range of 0.08 to 1.50 mass %, and excellent surface properties were obtained In Comparative Examples and Examples of Nos. 38 to 66, a surface layer of a titanium material was melted with electron beams under conditions to obtain a melting depth of 4 mm. Description is given on cases where various β stabilizer elements were added.

In Comparative Examples and Example of Nos. 38 to 42, a Ti—Mo alloy chip was used as the material containing the β stabilizer element. In Comparative Example of No. 38, the difference in β stabilizer element concentration between the base material and the melted and resolidified layer was less than 0.08 mass %, and coarse defects occurred partially on the surface of a hot-rolled sheet. In Examples of Nos. 39 to 41, the difference in β stabilizer element concentration between the base material and the melted and resolidified layer was within a range of 0.08 to 1.50 mass %, and in each case a hot-rolled sheet exhibited an excellent surface state as compared with Comparative Example of No. 38. In Comparative Example of No. 42, the difference in β stabilizer element concentration between the base material and the melted and resolidified layer exceeded 1.50 mass %, and coarse defects occurred partially on the surface of a hot-rolled sheet after pickling. Surface crack was observed as well; poor surface properties were exhibited.

In Comparative Example and Examples of Nos. 43 to 45, a V chip was used as the material containing the β stabilizer element. In Comparative Example of No. 43, the difference in stabilizer element concentration between the base material and the melted and resolidified layer was less than 0.08 mass %, and a hot-rolled sheet exhibited poor surface properties and coarse defects occurred partially. In Examples of Nos. 44 and 45, the difference in β stabilizer element concentration between the base material and the melted and resolidified layer was within a range of 0.08 to 1.50 mass %, and in both cases a hot-rolled sheet exhibited a surface state of an allowable level.

In Comparative Example and Examples of Nos. 46 to 48, a Mn chip was used as the material containing the β stabilizer element. In Comparative Example of No. 46, the difference in β stabilizer element concentration between the base material and the melted and resolidified layer was less than 0.08 mass %, and coarse defects occurred partially on the surface of a hot-rolled sheet. In Examples of Nos. 47 and 48, the difference in β stabilizer element concentration between the base material and the melted and resolidified layer was within a range of 0.08 to 1.50 mass %, and a surface state was in an allowable range as compared with Comparative Example of No. 46.

In Comparative Example and Examples of Nos. 49 to 51, a Fe—Nb alloy chip was used as the material containing the β stabilizer element. In Examples of Nos. 49 and 50, the difference in β stabilizer element concentration between the base material and the melted and resolidified layer was within a range of 0.08 to 1.50 mass %, and a surface state was excellent and defects were minor. In Comparative Example of No. 51, the difference in β stabilizer element concentration between the base material and the melted and resolidified layer exceeded 1.50 mass %, and coarse defects occurred partially on the surface of a hot-rolled sheet after pickling.

In Comparative Example and Examples of Nos. 52 to 54, a Co chip was used as the material containing the β stabilizer element. In Comparative Example of No. 52, the difference in β stabilizer element concentration between the base material and the melted and resolidified layer was less than 0.08 mass %, and coarse defects occurred partially on the surface of a hot-rolled sheet. In Examples of Nos. 53 and 54, the difference in β stabilizer element concentration between the base material and the melted and resolidified layer was within a range of 0.08 to 1.50 mass %, and a surface state was excellent as compared with Comparative Example of No. 52.

In Comparative Example and Examples of Nos. 55 to 57, a Cu chip was used as the material containing the β stabilizer element. In Comparative Example of No. 55, the difference in β stabilizer element concentration between the base material and the melted and resolidified layer was less than 0.08 mass %, and coarse defects occurred partially on the surface of a hot-rolled sheet after pickling. In Examples of Nos. 56 and 57, the difference in β stabilizer element concentration between the base material and the melted and resolidified layer was within a range of 0.08 to 1.50 mass %, and very excellent surface properties were exhibited.

In Comparative Example and Examples of Nos. 58 to 60, a titanium alloy chip obtained by crushing scrap of Ti-6Al-4V (6-4V chip), which is α+β type titanium alloy, was added as the material containing the β stabilizer element.

In Comparative Example of No. 58, the difference in β stabilizer element concentration between the base material and the melted and resolidified layer was less than 0.08 mass %, and coarse defects occurred partially on the surface of a hot-rolled sheet after pickling. In Examples of Nos. 59 and 60, although Al, which is an α stabilizer element, was added, the difference in β stabilizer element concentration between the base material and the melted and resolidified layer was within a range of 0.08 to 1.50 mass %, and surface defects were of an acceptable level.

In Comparative Example and Examples of Nos. 61 to 63, a titanium alloy chip obtained by crushing scrap of Ti-15V-3Cr-3Sn-3Al (15-3-3-3 chip), which is α+β type titanium alloy, was added as the material containing the β stabilizer element.

In Comparative Example of No. 61, the difference in β stabilizer element concentration between the base material and the melted and resolidified layer was less than 0.08 mass %, and coarse defects occurred partially on the surface of a hot-rolled sheet. In Examples of Nos. 62 and 63, Al, which is an stabilizer element, and Sn, which is a neutral element, were added, and the difference in β stabilizer element concentration between the base material and the melted and resolidified layer was within a range of 0.08 to 1.50 mass %. As surface defects of a hot-rolled sheet, they respectively exhibited somewhat coarse defects observed partially and minor defects; thus, the effect of suppressing surface defects of a hot-rolled sheet was demonstrated under these conditions as well.

In Comparative Examples and Examples of Nos. 64 to 68, surface layers of pure titanium and titanium alloy casting products were melted together with a Fe chip with electron beams under conditions to obtain a melting depth of 3 mm.

In Examples of Nos. 64 to 66, a titanium slab of pure titanium JIS class 3 was used as a titanium material.

In Comparative Example of No. 64, the difference in β stabilizer element concentration between the base material and the melted and resolidified layer was less than 0.08 mass %, and coarse defects occurred partially on the surface of a hot-rolled sheet. In Examples of Nos. 65 and 66, the difference in β stabilizer element concentration between the base material and the melted and resolidified layer was within a range of 0.08 to 1.50 mass %, and in each case surface defects of a hot-rolled sheet were minor.

In Examples of Nos. 67 and 68, a titanium slab of pure titanium JIS class 4 was used as a titanium material.

In Comparative Example of No. 67, the difference in β stabilizer element concentration between the base material and the melted and resolidified layer was less than 0.08 mass %, and coarse surface defects occurred partially in a hot-rolled sheet after pickling. In Example of No. 68, the difference in β stabilizer element concentration between the base material and the melted and resolidified layer was within a range of 0.08 to 1.50 mass %, and the surface of a hot-rolled sheet was excellent.

The invention claimed is:

1. A titanium cast ingot comprising:
    a base material consisting of 0.1 mass % or less C, 0.015 mass % or less H, 0.4 mass % or less O, 0.07 mass % or less N, 0.5 mass % or less Fe, and a balance comprising Ti, and
    a layer, formed on the base material, comprising one or more kinds of β stabilizer elements, wherein the layer has a depth of 1 mm or more, and
    wherein an average value of a total β stabilizer element concentration in a portion from a surface to a depth of 1 mm in the layer is higher than a total β stabilizer element concentration in the base material by, in mass %, equal to or more than 0.08 mass % and equal to or less than 1.50 mass %, and the portion from the surface to the depth of 1 mm in the layer has a fine acicular microstructure.

2. The titanium cast ingot according to claim 1,
    wherein the β stabilizer element(s) is/are one or more of Fe, Ni, and Cr.

3. The titanium cast ingot according to claim 1, wherein the layer comprises one or more kinds of a stabilizer elements or neutral elements together with the β stabilizer element(s).

4. A method for producing a titanium cast ingot, comprising:
    melting a surface of a base material consisting of 0.1 mass % or less C, 0.015 mass % or less H, 0.4 mass % or less O, 0.07 mass % or less N, 0.5 mass % or less Fe, and a balance comprising Ti together with a material containing a β stabilizer element and then
    solidifying the surface to make a layer with a depth of 1 mm or more wherein the layer has an average value of β stabilizer element concentration in a portion from a surface to a depth of 1 mm in the layer higher than β stabilizer element concentration in the base material by, in mass %, equal to or more than 0.08 mass % and equal to or less than 1.50 mass %, and the portion from the surface to the depth of 1 mm in the layer has a fine acicular microstructure.

5. The method for producing a titanium cast ingot according to claim 4,
    wherein the material containing the β stabilizer element is in a form of any of powder, a chip, wire, and foil.

6. The method for producing a titanium cast ingot according to claim 4,
    wherein the melting step comprises melting by electron-beam heating or plasma heating.

* * * * *